(12) United States Patent
Song

(10) Patent No.: US 11,474,516 B2
(45) Date of Patent: Oct. 18, 2022

(54) FLIGHT AIDING METHOD AND SYSTEM FOR UNMANNED AERIAL VEHICLE, UNMANNED AERIAL VEHICLE, AND MOBILE TERMINAL

(71) Applicant: SZ DJI TECHNOLOGY CO., LTD., Shenzhen (CN)

(72) Inventor: Jianyu Song, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 23 days.

(21) Appl. No.: 17/037,249

(22) Filed: Sep. 29, 2020

(65) Prior Publication Data

US 2021/0011473 A1 Jan. 14, 2021

Related U.S. Application Data

(63) Continuation of application No. 15/630,557, filed on Jun. 22, 2017, now Pat. No. 10,795,354, which is a
(Continued)

(51) Int. Cl.
*G05D 1/00* (2006.01)
*B64D 43/00* (2006.01)
(Continued)

(52) U.S. Cl.
CPC ......... *G05D 1/0044* (2013.01); *B64C 39/024* (2013.01); *B64D 43/00* (2013.01);
(Continued)

(58) Field of Classification Search
CPC .. G05D 1/0044; G05D 1/0016; G05D 1/0022; G05D 1/0038; G05D 1/0202;
(Continued)

(56) References Cited

U.S. PATENT DOCUMENTS 3,081,454 A * 3/1963 Gabelman ................. G01S 1/02
701/120
5,552,983 A * 9/1996 Thornberg ........... G05D 1/0033
244/3.11
(Continued)

FOREIGN PATENT DOCUMENTS

CN 102854887 A 1/2013
CN 102945046 A 2/2013
(Continued)

OTHER PUBLICATIONS

The World Intellectual Property Organization (WIPO) International Search Report for PCT/CN2014/095019 dated Oct. 8, 2015 6 Pages.
(Continued)

*Primary Examiner* — Rami Khatib
(74) *Attorney, Agent, or Firm* — Anova Law Group, PLLC

(57) ABSTRACT

A flight aiding method for an unmanned aerial vehicle includes receiving a receiving, from a mobile terminal that controls the unmanned aerial vehicle, a flight aiding instruction to execute a flight aiding function. The flight aiding method further includes in response to receiving the flight aiding instruction, controlling, regardless of a head direction that a head of the unmanned aerial vehicle is pointing, the unmanned aerial vehicle to fly by controlling both a velocity of the unmanned aerial vehicle along a reference direction and a velocity of the unmanned aerial vehicle perpendicular to the reference direction. The reference direction is defined for the unmanned aerial vehicle based on a position of a point of interest and a current location of the unmanned aerial vehicle.

19 Claims, 7 Drawing Sheets

Related U.S. Application Data continuation of application No. PCT/CN2014/095019, filed on Dec. 25, 2014.

(51) Int. Cl.
|          |            |
|----------|------------|
| *B64D 47/08* | (2006.01) |
| *G05D 1/02*  | (2020.01) |
| *B64C 39/02* | (2006.01) |
| *G01S 19/42* | (2010.01) |

(52) U.S. Cl.
CPC ........... *B64D 47/08* (2013.01); *G05D 1/0016* (2013.01); *G05D 1/0022* (2013.01); *G05D 1/0038* (2013.01); *G05D 1/0202* (2013.01); *B64C 2201/027* (2013.01); *B64C 2201/127* (2013.01); *B64C 2201/145* (2013.01); *B64C 2201/146* (2013.01); *G01S 19/42* (2013.01)

(58) Field of Classification Search
CPC .................. G05D 1/101; B64C 39/024; B64C 2201/027; B64C 2201/127; B64C 2201/145; B64C 2201/146; B64C 2201/021; B64C 2201/024; B64D 43/00; B64D 47/08; G01S 19/42; G01C 21/00; G08C 17/02; H04M 1/72415
See application file for complete search history.

(56) References Cited

U.S. PATENT DOCUMENTS

| 5,904,724 | A  | * | 5/1999  | Margolin  | G05D 1/0038 |
|-----------|----|---|---------|-----------|-------------|
|           |    |   |         |           | 701/2       |
| 9,090,348 | B2 | * | 7/2015  | Lesperance| G05D 1/0016 |
| 2003/0212478 | A1 | * | 11/2003 | Rios     | G05D 1/0094 |
|           |    |   |         |           | 701/13      |
| 2004/0193334 | A1 | * | 9/2004  | Carlsson | G05D 1/0202 |
|           |    |   |         |           | 701/9       |
| 2010/0084513 | A1 | * | 4/2010  | Gariepy  | B64C 39/024 |
|           |    |   |         |           | 244/190     |
| 2011/0046817 | A1 | * | 2/2011  | Hamke    | G05D 1/101  |
|           |    |   |         |           | 701/3       |
| 2011/0320068 | A1 |   | 12/2011 | Lee et al. |            |
| 2014/0207282 | A1 | * | 7/2014  | Angle    | G06Q 10/1095 |
|           |    |   |         |           | 901/1       |
| 2016/0042637 | A1 | * | 2/2016  | Cahill   | G16H 40/67  |
|           |    |   |         |           | 701/3       |
| 2016/0107749 | A1 | * | 4/2016  | Mucci    | G06Q 50/26  |
|           |    |   |         |           | 701/3       |

FOREIGN PATENT DOCUMENTS

| CN | 102955478 A  | 3/2013  |
| CN | 102999046 A  | 3/2013  |
| CN | 104007766 A  | 8/2014  |
| CN | 104180796 A  | 12/2014 |
| CN | 102417037 B  | 8/2015  |
| CN | 205353775 U  | 6/2016  |
| JP | H06312700 A  | 11/1994 |
| JP | H09510032 A  | 10/1997 |
| JP | 2003202922 A | 7/2003  |
| JP | 2004359002 A | 12/2004 |
| JP | 2006082774 A | 3/2006  |
| JP | 2009036726 A | 2/2009  |
| JP | 2009515771 A | 4/2009  |
| JP | 2012090409 A | 5/2012  |
| JP | 2013144539 A | 7/2013  |
| WO | 2008044309 A1 | 4/2008 |
| WO | 2013144508 A1 | 10/2013 |

OTHER PUBLICATIONS

Xian-Liang Wu et al., An Overview of Vision-Based UAV Navigation, Journal of System Simulation, Feb. 2010, pp. 62-65, vol. 22, Suppl. 1, China.

* cited by examiner

FLIGHT AIDING METHOD AND SYSTEM FOR UNMANNED AERIAL VEHICLE, UNMANNED AERIAL VEHICLE, AND MOBILE TERMINAL

CROSS-REFERENCE TO RELATED APPLICATIONS

This is a continuation of application Ser. No. 15/630,557, filed on Jun. 22, 2017, which is a continuation of International Application No. PCT/CN2014/095019, filed on Dec. 25, 2014, the entire contents of both of which are incorporated herein by reference.

TECHNICAL FIELD

The present disclosure relates to a system and a method for aiding the flight of an unmanned aerial vehicle.

BACKGROUND

In recent years, unmanned aerial vehicles (for example, fixed-wing aircrafts, rotor aircrafts including helicopters) have been widely used, for example, in detection, search and rescue and other fields. Usually an unmanned aerial vehicle is relatively small, thus when an operator operates the unmanned aerial vehicle, it may be difficult to see the unmanned aerial vehicle clearly with naked eyes when the unmanned aerial vehicle flies away (for example, four or five hundred meters away). In this case, it may be difficult for the operator to obverse a heading angle of the unmanned aerial vehicle, and the operator might be blind flying. Without an flight aiding means, the unmanned aerial vehicle may be lost. On the other hand, if the user operates the unmanned aerial vehicle in a First Person View (FPV) mode, the operator may pay too much attention to a display screen, without noticing the position of the unmanned aerial vehicle, causing the unmanned aerial vehicle to lose its direction and even get lost. Moreover, the operator needs to observe the position of the unmanned aerial vehicle while watching the FPV, and user experience will be reduced.

SUMMARY

An objective of the present disclosure is to provide a flight aiding system and method of an unmanned aerial vehicle, an unmanned aerial vehicle and a mobile terminal, to help an operator easily control a current flying position and a flying state of the unmanned aerial vehicle and be able to control flight of the unmanned aerial vehicle accordingly.

In accordance with the disclosure, there is provided a flight aiding method for an unmanned aerial vehicle including receiving a flight aiding instruction to execute a flight aiding function, recording a position of a point of interest, recording a current location of the unmanned aerial vehicle, and defining a forward flight direction of the unmanned aerial vehicle based on the position of the point of interest and the current location of the unmanned aerial vehicle.

Also in accordance with the disclosure, there is provided an unmanned aerial vehicle including a casing and a main controller disposed in the casing. The main controller is configured to receive a flight aiding instruction to execute a flight aiding function, record a position of a point of interest and a current location of the unmanned aerial vehicle, and define a forward flight direction of the unmanned aerial vehicle based on the position of the point of interest and the current location of the unmanned aerial vehicle.

Compared to conventional technologies, according to the flight aiding method and system, the unmanned aerial vehicle and the mobile terminal of the present disclosure, an operator can trigger the unmanned aerial vehicle to execute a flight aiding function, and can control a flight path of the unmanned aerial vehicle freely without taking his/her eyes off a display screen of the mobile terminal. Thus, blind flying and flyaway can be avoided, and at the same time, flight experience of the operator is improved.

DETAILED DESCRIPTION OF THE EMBODIMENTS

The technical solution of the present disclosure will be described in more detail below with reference to the accompanying drawings of the present disclosure. It is apparent that the embodiments described are merely some rather than all embodiments of the present disclosure. Based on the embodiments described herein, all other embodiments obtained by persons of ordinary skill in the art without creative efforts all fall within the scope of the present disclosure.

Figure 1:
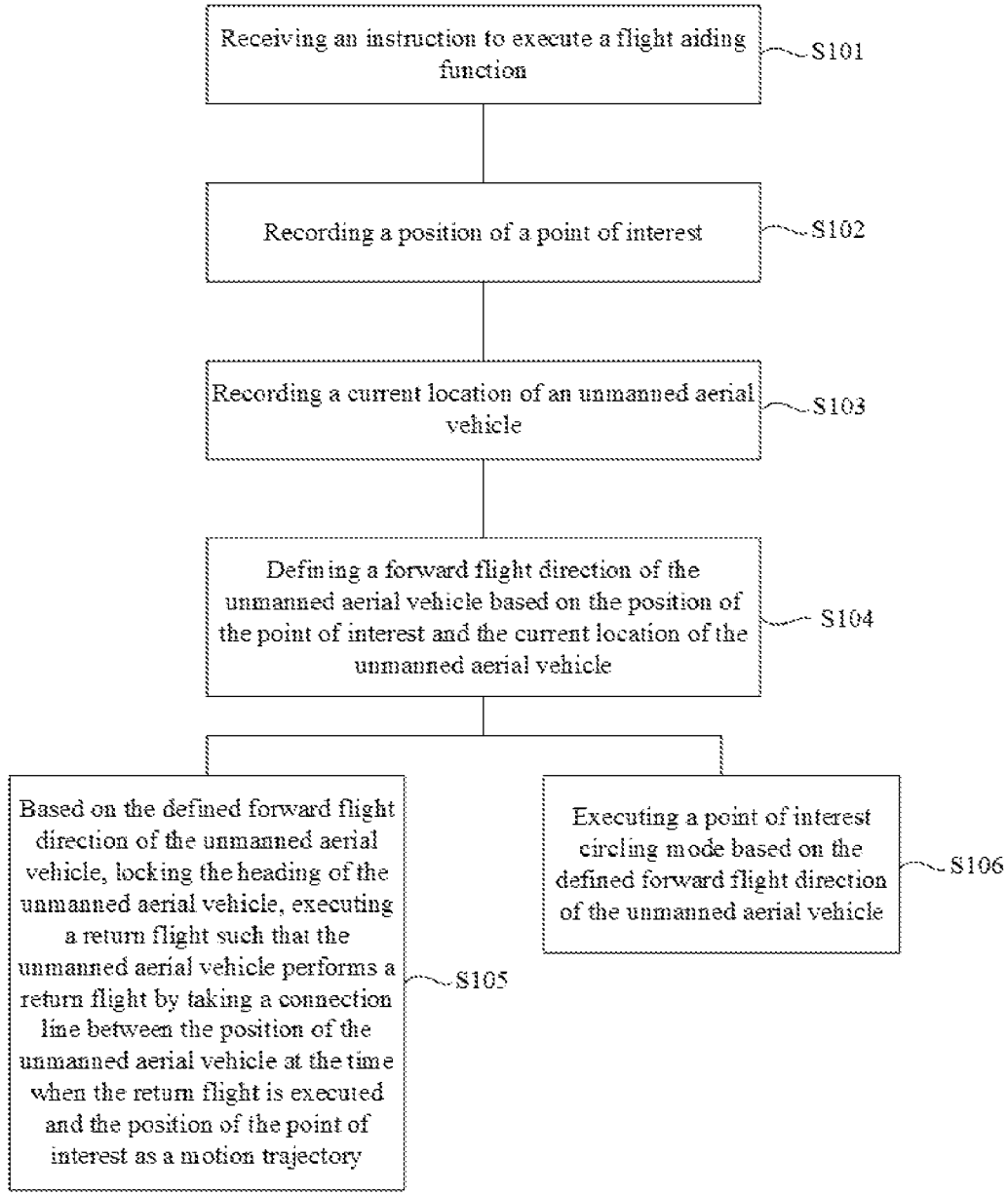
FIG. 1 is a flow chart of a flight aiding method of an unmanned aerial vehicle according to an embodiment of the present disclosure.

FIG. 1 is a flow chart showing an exemplary flight aiding method for an unmanned aerial vehicle according to the present disclosure. As shown in FIG. 1, at S101, an instruction to execute a flight aiding function is received. The instruction to execute a flight aiding function is also referred to as a flight aiding instruction.

Figure 2:
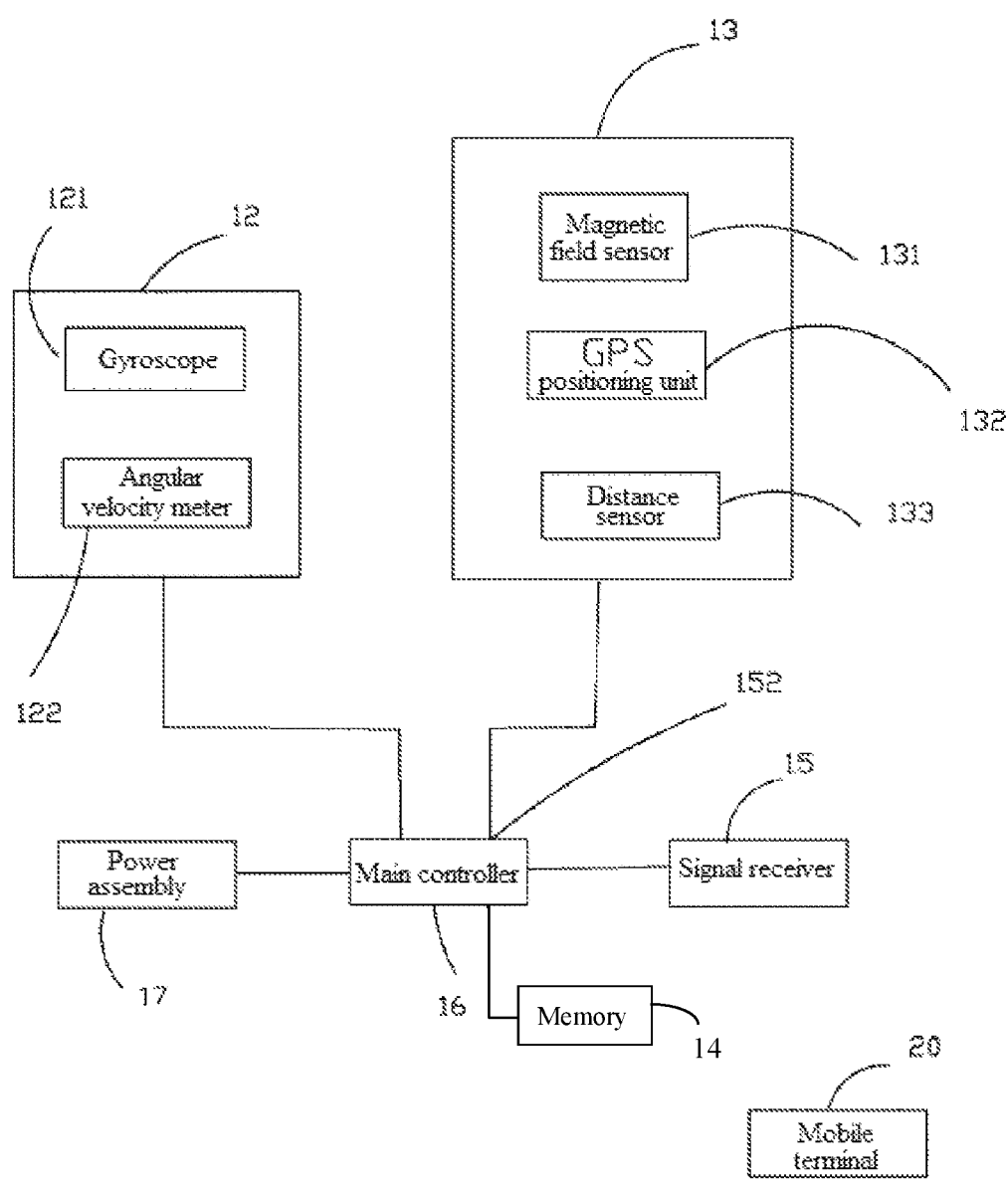
FIG. 2 is a schematic diagram of a frame of the unmanned aerial vehicle in FIG. 1.
Figure 3:
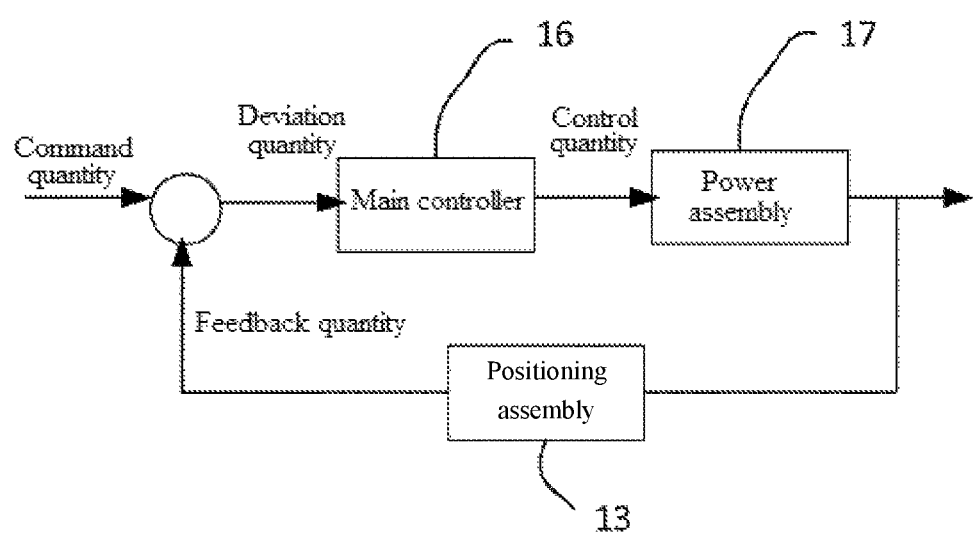
FIG. 3 is a schematic diagram of circling control of the unmanned aerial vehicle.
Figure 4:
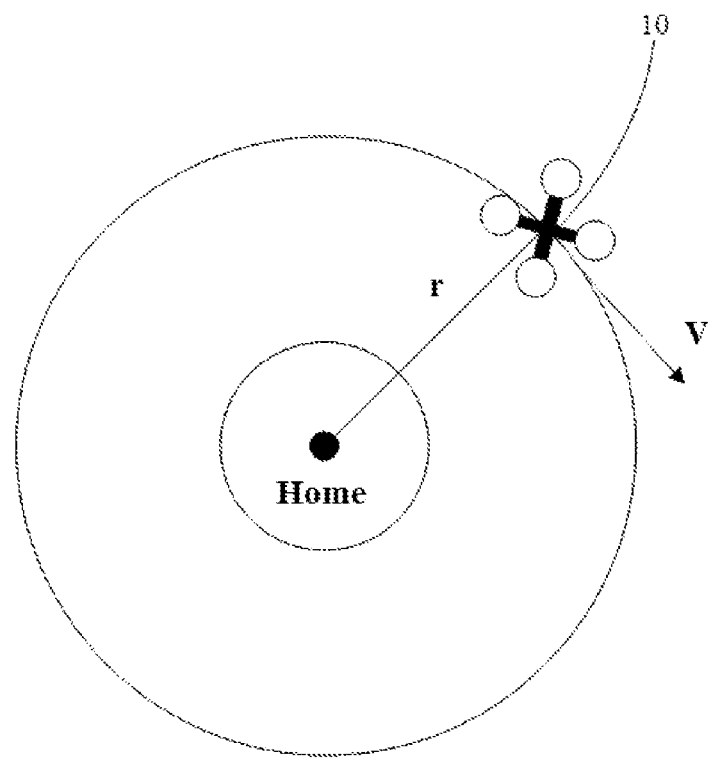
FIG. 4 is a schematic control diagram illustrating that the unmanned aerial vehicle flies around a point of interest.

Referring to FIGS. 2-4, a mobile terminal 20 can send a flight aiding instruction to an unmanned aerial vehicle 10. The mobile terminal 20 and the unmanned aerial vehicle 10 are in wireless communication, and a signal receiver 15 of the unmanned aerial vehicle 10 receives the flight aiding instruction and sends the received flight aiding instruction to a main controller 16 of the unmanned aerial vehicle 10. In this embodiment, the mobile terminal 20 and the unmanned aerial vehicle 10 achieve wireless communication through, e.g., a Wi-Fi network, or a 2G, 3G, 4G, or 5G network. The mobile terminal 20 can be a remote controller including a button 21 that starts the flight aiding function. In other embodiments, the mobile terminal 20 may be a tablet computer or a mobile phone including a virtual button for starting the flight aiding function. The mobile terminal 20 can display a satellite map.

Referring again to FIG. 1, at S102, a position of a point of interest is recorded. The point of interest may be a takeoff point of the unmanned aerial vehicle 10, or a location of the mobile terminal 20. In some embodiments, the takeoff point is a position recorded when enough positioning satellites are found by searching for the first time after the unmanned aerial vehicle is powered on. When the mobile terminal 20 is installed with a Global Positioning System (GPS), the position of the mobile terminal 20 can be recorded by the GPS on the mobile terminal 20. That is, the point of interest changes with a change in the position of the mobile terminal 20. If the mobile terminal 20 is a tablet computer or a mobile phone, the point of interest may be any point selected from a satellite map displayed by the tablet computer or the mobile phone. In some other embodiments, the point of interest may be another point designed as required, which is not limited to those described above.

At S103, a current location of the unmanned aerial vehicle is recorded. In some embodiments, as shown in FIGS. 2 and 3, the unmanned aerial vehicle 10 includes a positioning assembly 13. The positioning assembly 13 can record a current location of the unmanned aerial vehicle 10. As shown in FIG. 2, the positioning assembly 13 includes a magnetic field sensor 131, a GPS positioning unit 132, and a distance sensor 133. In some embodiments, the magnetic field sensor 131 includes a compass, and the distance sensor 133 includes a barometer. The positioning assembly 13 is electrically connected to a main controller 16. The main controller 16 is configured to detect operational data of the magnetic field sensor 131 and the GPS positioning unit 132. In some other embodiments, the distance sensor 133 may include an ultrasonic sensor or the like, which is not limited to the examples described above. In some embodiments, the current location of the unmanned aerial vehicle 10 can be measured through the positioning unit 132 and a height measuring device.

At S104, a forward flight direction of the unmanned aerial vehicle is defined based on the position of the point of interest and the current location of the unmanned aerial vehicle. As used in this disclosure, the forward flight direction refers to a direction when a pitch stick of the mobile terminal 20, which is used for controlling the unmanned aerial vehicle 10 to fly, controls the unmanned aerial vehicle 10 to fly forward relative to the position of the point of interest. As shown in FIG. 4 the forward flight direction is a direction along an extension line of a connection-line between the point of interest and the location point of the unmanned aerial vehicle 10, i.e., an extension line of a connection-line between a coordinate of the point of interest in a two-dimensional plane and a coordinate of the location point of the unmanned aerial vehicle 10 in the two-dimensional plane. For example, the coordinate of the point of interest is (X0, Y0, Z0), the coordinate of the location point of the unmanned aerial vehicle 10 is (X1, Y1, Z1), and the forward flight direction is an extension line of a connection-line between the point of interest (X0, Y0) and the location point (X1, Y1) of the unmanned aerial vehicle 10.

At S105, based on the defined forward flight direction of the unmanned aerial vehicle, the heading of the unmanned aerial vehicle is locked, and a return flight is executed. The unmanned aerial vehicle performs a return flight by taking a connection line between the position of the unmanned aerial vehicle at the time when the return flight is executed and the position of the point of interest as a motion trajectory.

Since the forward flight direction of the unmanned aerial vehicle is redefined, the unmanned aerial vehicle 10 may operate in a headless mode, and perform a return flight by taking the connection line between the position of the unmanned aerial vehicle and the position of the point of interest as the motion trajectory. When the pitch stick of the mobile terminal 20 is operated downwards to control the unmanned aerial vehicle 10 to perform the return flight, the unmanned aerial vehicle 10 flies in a direction towards the point of interest by taking the connection line between the position of the unmanned aerial vehicle and the position of the point of interest as the motion trajectory. In some embodiments, the unmanned aerial vehicle 10 accelerates along a radial direction (along a radius direction) and, at the same time, a position and velocity of the unmanned aerial vehicle 10 in in a tangent direction (a tangent direction the unmanned aerial vehicle 10 is in, i.e., a direction tangential to a circumference of a circle that takes the point of interest as the center of the circle and a distance between the location of the unmanned aerial vehicle 10 and the point of interest as a radius) are controlled, e.g., the position of the unmanned aerial vehicle 10 in the tangent direction is controlled to remain approximately unchanged and the velocity of the unmanned aerial vehicle 10 in the tangent direction is controlled to remain approximately zero. The acceleration ($a_x$, $a_y$) of the unmanned aerial vehicle 10 in a ground coordinate system defined relative to the ground is used as a control quantity, and then the control quantity is converted to a control quantity in a body coordinate system defined relative to the unmanned aerial vehicle:

$$\begin{bmatrix} a_x^b \\ a_y^b \end{bmatrix} = R \begin{bmatrix} a_x \\ a_y \end{bmatrix}$$

The unmanned aerial vehicle 10 can achieve radial accelerated motion according to the control command, where $$R = \begin{bmatrix} \cos\varphi & -\sin\varphi \\ \sin\varphi & \cos\varphi \end{bmatrix},$$

$\varphi$ is a rotational angle of the body coordinate system (xb, yb) relative to the ground coordinate system (x, y), and is also a yaw angle of the unmanned aerial vehicle 10.

In this embodiment, in order to prevent the unmanned aerial vehicle 10 from swinging back and forth in the vicinity of the point of interest, when the distance between the unmanned aerial vehicle 10 and the point of interest is shorter than a first threshold, the unmanned aerial vehicle 10 can decelerate until it hovers. The first threshold can be between about 50 meters and about 100 meters. In other embodiments, the first threshold may be set as needed, and is not limited to the above examples.

Using the flight aiding method for unmanned aerial vehicle consistent with embodiments of the disclosure, an operator can control a flight path of the unmanned aerial vehicle without taking his/her eyes off the display screen of the mobile terminal 20, which avoids blind flying and flyaway and also improves flight experience of the operator.

At S106, a point of interest mode is executed based on the defined forward flight direction of the unmanned aerial vehicle. While remotely controlling the unmanned aerial vehicle, the operator sometimes needs the unmanned aerial vehicle to fly around a point of interest, such as a transmission line fault point, a disaster frequent point, an accident occurring point, or the like, to perform fly-around monitoring.

When receiving an instruction to execute roll control, the unmanned aerial vehicle 10 can lock its flight to perform a circular motion on a circle with a certain radius, and at the same time, control its position and velocity in the radial direction. As such, the position of the unmanned aerial vehicle 10 in the radial direction remains approximately unchanged and the velocity of the unmanned aerial vehicle 10 in the radial direction remains approximately zero. This is equivalent to giving a tangent acceleration to the unmanned aerial vehicle 10, as shown in FIG. 4. Details of the operation of the unmanned aerial vehicle 10 when it receives the instruction to execute roll control are described below.

Command quantity: a desired control position of the unmanned aerial vehicle 10, $(x_r, y_r)$,
which can be represented in a form of polar coordinates as follows:

$$\begin{cases} x_r = r\cos\theta \\ y_r = r\sin\theta \end{cases},$$

where r is a distance from the unmanned aerial vehicle to a home point, i.e., a point of interest, which remains unchanged in a circling process, and θ is an angular coordinate, which can be, e.g., a polar angle or an azimuthal angle.

Feedback quantity: the current position of the unmanned aerial vehicle (x, y).

Deviation quantity: a difference between the desired control position and the current position of the unmanned aerial vehicle:

$$\begin{cases} e_x = x_r - x \\ e_y = y_r - y \end{cases}$$

where $e_x$ indicates a position deviation in the direction of the x axis, and $e_y$ indicates a position deviation in the direction of the y axis.

The control quantity can be obtained through a calculation by the main controller 16 of the unmanned aerial vehicle 10 based on the deviation quantity. The calculation process is as follows:

First, the control quantity in the ground coordinate system is calculated:

$$\begin{cases} u_x = f(e_x) \\ u_y = g(e_y) \end{cases},$$

which is then converted to the control quantity in the body coordinate system:

$$\begin{bmatrix} u_x^b \\ u_y^b \end{bmatrix} = R \begin{bmatrix} u_x \\ u_y \end{bmatrix},$$

where $$R = \begin{bmatrix} \cos\varphi & -\sin\varphi \\ \sin\varphi & \cos\varphi \end{bmatrix},$$

and φ is a rotational angle of the body coordinate system (xb, yb) relative to the ground coordinate system (x, y), which is also a yaw angle of the unmanned aerial vehicle 10.

If the unmanned aerial vehicle 10 is performing the circular motion at a velocity of v, a centripetal force $$F_{cen} = m\frac{v^2}{r}$$

may need to be provided. At the same time, the position and velocity of the unmanned aerial vehicle 10 in the radial direction are controlled, and the unmanned aerial vehicle 10 is locked to fly on a circle with a radius of r. From the equation for calculating $F_{cen}$, it can be seen that $F_{cen}$ is directly proportional to v and is inversely proportional to r. Suppose that a maximum centripetal force that the unmanned aerial vehicle 10 can provide is $F_{max}$, which is determined by the maximum yaw angle allowed by the unmanned aerial vehicle 10, then when the unmanned aerial vehicle 10 flies in a circle along a circumference with a radius of r, the maximum allowed velocity is $$v_{max} = \sqrt{\frac{F_{max} r}{m}},$$

which is related to the mass of the unmanned aerial vehicle 10. If it is intended to increase the circling velocity of the unmanned aerial vehicle 10, a flying radius may need to be increased.

When the unmanned aerial vehicle 10 receives a pitch control instruction and a roll control instruction at the same time, the unmanned aerial vehicle 10 will perform a centripetal or a centrifugal motion.

Moreover, when the unmanned aerial vehicle 10 receives roll and yaw control instructions at the same time, the unmanned aerial vehicle 10 can rotate and lock into a flight of a circular motion on a circle with a certain radius, and the position and velocity of the unmanned aerial vehicle 10 in the radial direction are controlled such that the position of the unmanned aerial vehicle 10 in the radial direction remains approximately unchanged, and the velocity of the unmanned aerial vehicle 10 in the radial direction remains approximately zero.

Using a method consistent with embodiments of the disclosure, an operator without excellent operating skills can control an unmanned aerial vehicle to execute a circular motion around a point of interest, which increases the operator's experience.

Figure 5:
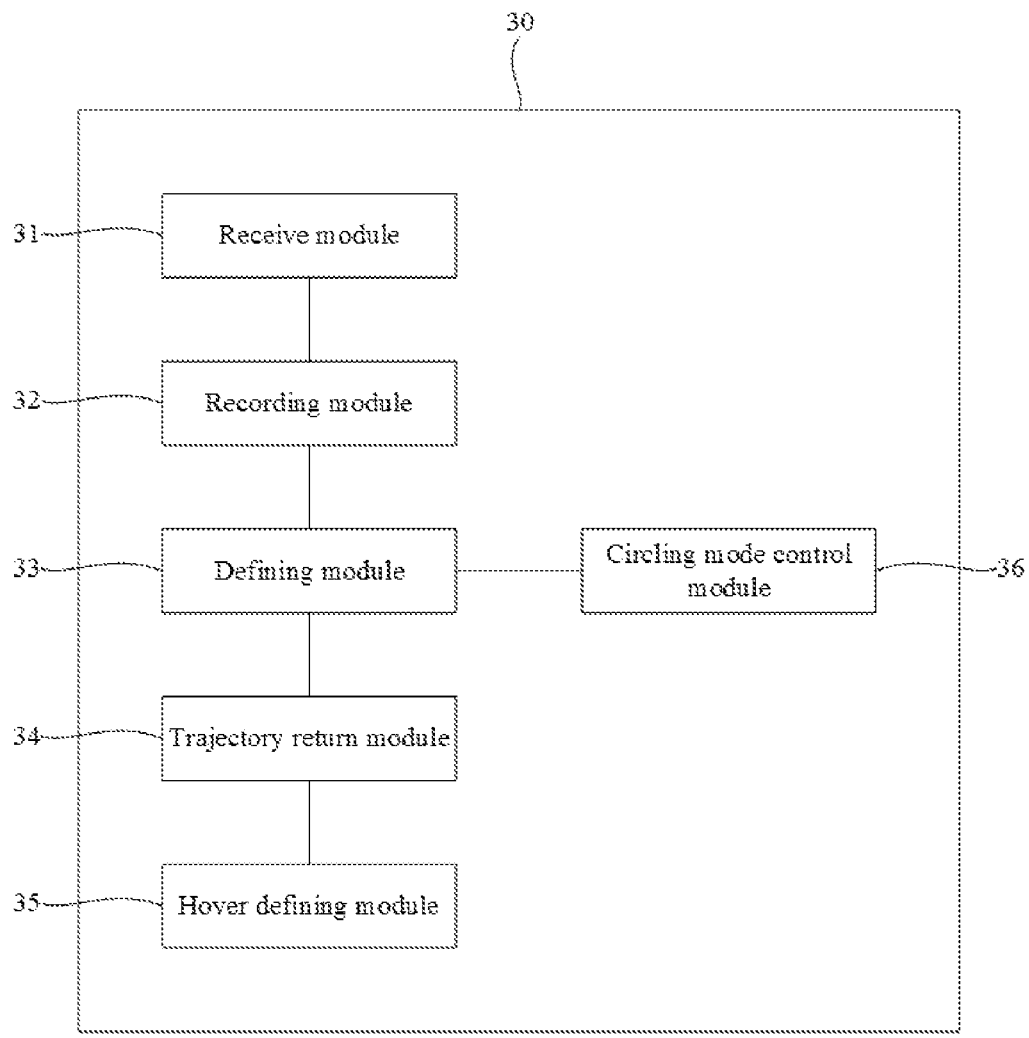
FIG. 5 is a functional module diagram of a flight aiding system of an unmanned aerial vehicle according to an embodiment of the present disclosure.

FIG. 5 is a block diagram of a flight aiding system 30 of an unmanned aerial vehicle according to an embodiment of the present disclosure. As shown in FIG. 5, the flight aiding system 30 includes a receiving module 31, a recording module 32, a defining module 33, a trajectory return module 34, a hover defining module 35, and a circling mode control module 36.

The receiving module 31 is configured to receive an instruction to execute a flight aiding function. Referring to FIGS. 2-4 together, the receiving module 31 receives a flight aiding instruction sent by the mobile terminal 20. In some embodiments, the signal receiver 15 of the unmanned aerial vehicle 10 receives the flight aiding instruction, and the receiving module 31 receives the flight aiding instruction received by the signal receiver 15.

The recording module 32 is configured to record a position of a point of interest and a current location of the unmanned aerial vehicle 10. The point of interest may be a takeoff point of the unmanned aerial vehicle 10, or the location of the mobile terminal 20. In some embodiments, the takeoff point is a position recorded when enough positioning satellites are found by searching for the first time after the unmanned aerial vehicle 10 is powered on. When the mobile terminal 20 is mounted with a remote controller having a GPS function, the position of the mobile terminal 20 can be recorded by the GPS on the mobile terminal 20. That is, the point of interest changes with a change in the position of the mobile terminal 20. In other embodiments, the mobile terminal 20 may be a tablet computer or a mobile phone having a virtual button for starting the flight aiding function. The mobile terminal 20 displays a satellite map. The unmanned aerial vehicle 10 is provided thereon with a positioning assembly 13, and a current location of the unmanned aerial vehicle 10 can be obtained by the positioning assembly 13. The recording module 32 records the current location of the unmanned aerial vehicle 10 obtained by the positioning assembly 13.

The defining module 33 is configured to define a forward flight direction of the unmanned aerial vehicle 10 based on the position of the point of interest and the current location of the unmanned aerial vehicle 10. As noted above, the forward flight direction refers to a direction when a pitch stick of the mobile terminal 20, which is used for controlling the unmanned aerial vehicle 10 to fly, controls the unmanned aerial vehicle 10 to fly forward relative to the position of the point of interest. As shown in FIG. 4, the forward flight direction is a direction along an extension line of a connection-line between the point of interest and the location point of the unmanned aerial vehicle 10, i.e., an extension line of a connection-line between a coordinate of the point of interest in a two-dimensional plane and a coordinate of the location point of the unmanned aerial vehicle 10 in a two-dimensional plane. For example, the coordinate of the point of interest is (X0, Y0, Z0), the coordinate of the location point of the unmanned aerial vehicle 10 is (X1, Y1, Z1), and the forward flight direction is an extension line of a connection-line between the point of interest (X0, Y0) and the location point (X1, Y1) of the unmanned aerial vehicle 10.

The trajectory return module 34 is configured to, based on the forward flight direction of the unmanned aerial vehicle 10 defined by the defining module 33, lock the heading of the unmanned aerial vehicle 10, and cause the unmanned aerial vehicle 10 to perform a return flight by taking a connection line between the position of the unmanned aerial vehicle 10 at the time when the return flight is executed and the position of the point of interest as a motion trajectory.

As shown in FIG. 4, when the unmanned aerial vehicle 10 receives an instruction to execute pitch control, the unmanned aerial vehicle 10 accelerates along a radial direction (along a radius direction), and at the same time, position and velocity of the unmanned aerial vehicle 10 in a tangential direction are controlled, e.g., the position of the unmanned aerial vehicle 10 in the tangent direction is controlled to be unchanged and the velocity of the unmanned aerial vehicle 10 in the tangent direction is controlled to be approximately zero. As noted above, the tangent direction that the unmanned aerial vehicle 10 is in refers to a direction tangential to a circumference of a circle that takes the point of interest as circle center and a distance between the location of the unmanned aerial vehicle 10 and the point of interest as a radius. The acceleration ($a_x$, $a_y$) of the unmanned aerial vehicle 10 in the ground coordinate system is used as a control quantity, which can be converted to a control quantity in the body coordinate system, as follows:

$$\begin{bmatrix} a_x^b \\ a_y^b \end{bmatrix} = R \begin{bmatrix} a_x \\ a_y \end{bmatrix}.$$

The unmanned aerial vehicle 10 can achieve radial accelerated motion according to the control command, where $$R = \begin{bmatrix} \cos\varphi & -\sin\varphi \\ \sin\varphi & \cos\varphi \end{bmatrix},$$

$\varphi$ is a rotational angle of the body coordinate system (xb, yb) relative to the ground coordinate system (x, y), and is also a yaw angle of the unmanned aerial vehicle 10.

In a process of executing the return flight, when a distance between the unmanned aerial vehicle 10 and the point of interest is shorter than a first threshold, the hover defining module 35 can control the unmanned aerial vehicle 10 to decelerate until the unmanned aerial vehicle 10 hovers. In some embodiments, the first threshold can be between about 50 meters and about 100 meters. In other embodiments, the first threshold may be set as needed, and is not limited to the above examples.

While remotely controlling an unmanned aerial vehicle, the operator sometimes needs the unmanned aerial vehicle to fly around a point of interest, such as a transmission line fault point, a disaster frequent point, an accident occurring point, or the like, to perform a fly-around monitoring. When receiving an instruction to execute pitch control, the flight aiding system 30 of the unmanned aerial vehicle 10 controls the unmanned aerial vehicle 10 to accelerate along the radial direction, and at the same time, controls the position and velocity of the unmanned aerial vehicle 10 in the tangent direction.

When the flight aiding system 30 receives an instruction to execute roll control, the circling mode control module 36 controls the unmanned aerial vehicle 10 to lock its flight to perform a circular motion on a circle with a certain radius, and at the same time, control the velocity of the unmanned aerial vehicle 10 to remain approximately zero in the radial direction. This is equivalent to giving a tangent acceleration to the unmanned aerial vehicle 10, as shown in FIG. 4. Details of the operation of the unmanned aerial vehicle 10 when it receives the instruction to execute roll control are described below.

Command quantity: a desired control position of the unmanned aerial vehicle 10, ($x_r$, $y_r$), which can be represented in a form of polar coordinates as follows:

$$\begin{cases} x_r = r\cos\theta \\ y_r = r\sin\theta \end{cases},$$

where r is a distance from the unmanned aerial vehicle to a home point, i.e., a point of interest, which remains unchanged in a circling process, and $\theta$ is an angular coordinate, which can be, e.g., a polar angle or an azimuthal angle.

Feedback quantity: the current position of the unmanned aerial vehicle (x, y).

Deviation quantity: a difference between the desired control position and the current position of the unmanned aerial vehicle:

$$\begin{cases} e_x = x_r - x \\ e_y = y_r - y \end{cases}$$

where $e_x$ indicates a position deviation in the direction of the x axis, and $e_y$ indicates a position deviation in the direction of the y axis.

The control quantity can be obtained through a calculation by the main controller 16 of the unmanned aerial vehicle 10 based on the deviation quantity. The calculation process is as follows:

First, the control quantity in the ground coordinate system is calculated:

$$\begin{cases} u_x = f(e_x) \\ u_y = g(e_y) \end{cases},$$

which is then converted to the control quantity in the body coordinate system:

$$\begin{bmatrix} u_x^b \\ u_y^b \end{bmatrix} = R \begin{bmatrix} u_x \\ u_y \end{bmatrix},$$

where $$R = \begin{bmatrix} \cos\varphi & -\sin\varphi \\ \sin\varphi & \cos\varphi \end{bmatrix},$$

and φ is a rotational angle of the body coordinate system (xb, yb) relative to the ground coordinate system (x, y), which is also a yaw angle of the unmanned aerial vehicle 10.

If the unmanned aerial vehicle 10 is performing the circular motion at a velocity of v, a centripetal force $$F_{cen} = m\frac{v^2}{r}$$

may need to be provided. At the same time, the position and velocity of the unmanned aerial vehicle 10 in the radial direction are controlled, and the unmanned aerial vehicle 10 is locked to fly on a circle with a radius of r. From the equation for calculating $F_{cen}$, it can be seen that $F_{cen}$ is directly proportional to v and is inversely proportional to r. Suppose that a maximum centripetal force that the unmanned aerial vehicle 10 can provide is $F_{max}$, which is determined by the maximum yaw angle allowed by the unmanned aerial vehicle 10, then when the unmanned aerial vehicle 10 flies in a circle along a circumference with a radius of r, the maximum allowed velocity is $$v_{max} = \sqrt{\frac{F_{max} r}{m}},$$

which is related to the mass of the unmanned aerial vehicle 10. If it is intended to increase the circling velocity of the unmanned aerial vehicle 10, a flying radius may need to be increased.

When the flight aiding system 30 receives a pitch control instruction and a roll control instruction at the same time, the circling mode control module 36 controls the unmanned aerial vehicle 10 to perform a centripetal or a centrifugal motion.

Moreover, when the flight aiding system 30 receives roll and yaw control instructions at the same time, the unmanned aerial vehicle 10 can rotate and lock into a flight of a circular motion on a circle with a radius, and the position and velocity of the unmanned aerial vehicle 10 in the radial direction are controlled such that the position of the unmanned aerial vehicle 10 in the radial direction remains unchanged, and the velocity of the unmanned aerial vehicle 10 in the radial direction remains approximately zero.

Using a flight aiding system consistent with embodiments of the disclosure, an operator without excellent operating skills can control an unmanned aerial vehicle to execute a circular motion around a point of interest, which increases the operator's experience.

For example, by using the flight aiding system 30 for an unmanned aerial vehicle as described above, an operator can control a flight path of the unmanned aerial vehicle without taking his/her eyes off a display screen of the mobile terminal, which avoids blind flying and flyaway, and also improves flight experience of the operator.

Figure 6:
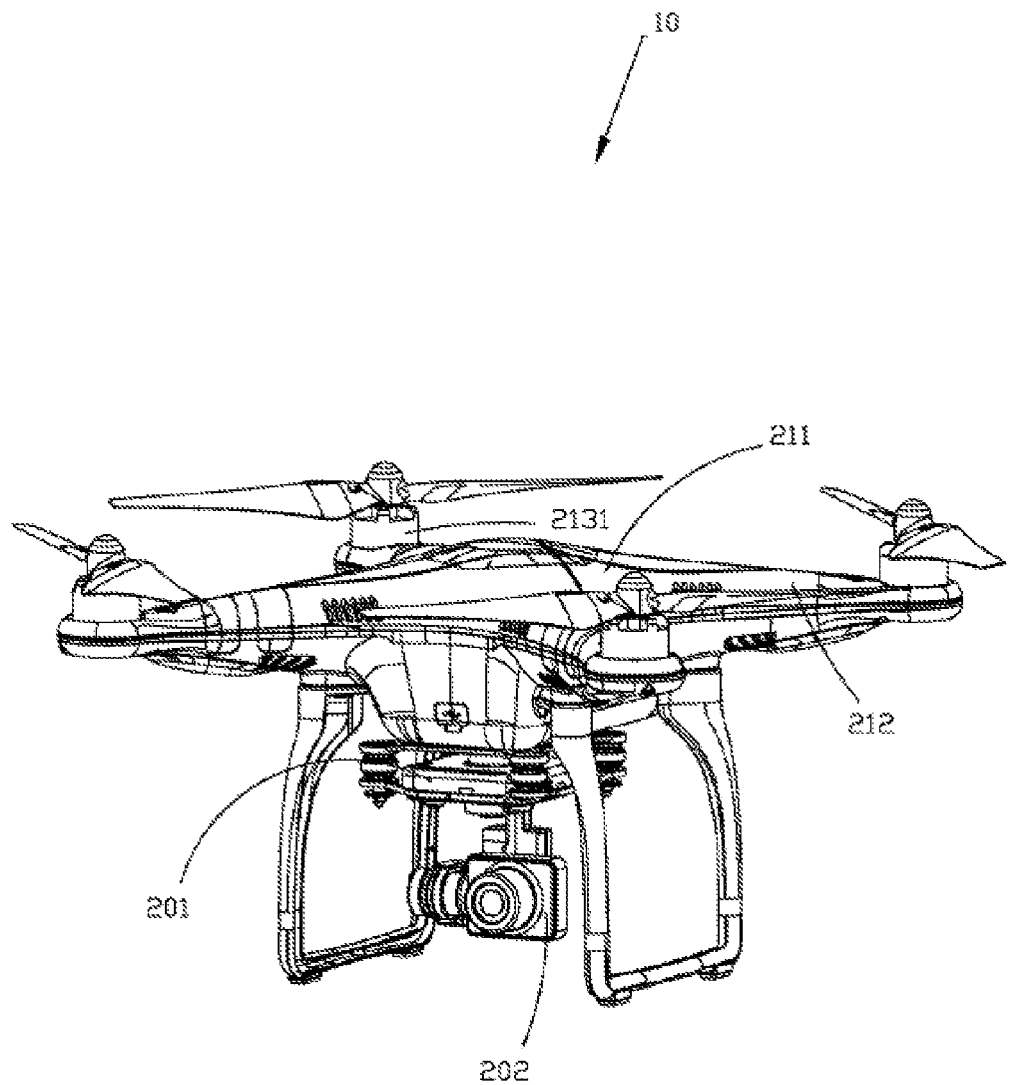
FIG. 6 is a schematic three-dimensional diagram of an unmanned aerial vehicle according to an embodiment of the present disclosure.

Referring to FIGS. 5 and 6, the unmanned aerial vehicle 10 according to an embodiment of the present disclosure can be used as an auxiliary device for video recording, photographing, monitoring, or sampling, and can be used in an air-based field and, for example, be carried by a rotor aircraft or a fixed wing aircraft, a water-based field and, for example, be carried by a submarine or a ship, a land-based field and, for example, be carried by a motor vehicle, or a space-based field and, for example, be carried by a satellite, a space station, or a spaceship, or the like.

The unmanned aerial vehicle 10 includes a casing 211, a gimbal 201 disposed at the casing 211 and can rotate relative to the casing 211 around at least one axis, and a load 202 carried by the gimbal 201. The gimbal 201 can fix the load 202, randomly adjust attitude of the load 202 (for example, changing the height, tilt angle, and/or direction of the load), and stably maintaining the load 202 on a determined attitude. The load 202 may be an imaging device such as a camera or a video camera.

The unmanned aerial vehicle 10 further includes four vehicle arms 212 connected with the casing 211, a power assembly 17 (see, e.g., FIGS. 2 and 3) disposed on the vehicle arms 212 and configured to drive the unmanned aerial vehicle 10 to fly, and a main controller 16 (see, e.g., FIGS. 2 and 3). The vehicle arms 212 may be in a suitable shape such as a hollow arm shape, which may be in communication with an inner cavity of the casing 211. The main controller 16 can perform functions such as controlling respective related components. The main controller 16 can further be electrically coupled to the gimbal 201 and the load 202 for controlling the gimbal 201 and the load 202.

As shown in FIGS. 2 and 3, the unmanned aerial vehicle 10 further includes an Inertial Measurement Unit (IMU) 12, a positioning assembly 13, a memory 14, and a signal receiver 15. The IMU 12, the positioning assembly 13, the memory 14, the signal receiver 15, the main controller 16, and the power assembly 17 can all be mounted to the casing.

The IMU 12 is configured to measure attitude information of the unmanned aerial vehicle 10. The IMU 12 includes a gyroscope 121 and an angular velocity meter 122. The main controller 16 is electrically coupled to the IMU 12 for detecting operational data of the gyroscope 121 and the angular velocity meter 122. The main controller 16 is also electrically coupled to the signal receiver 15 for receiving a control signal received by the signal receiver 15 to control the unmanned aerial vehicle 10.

The positioning assembly 13 includes a magnetic field sensor 131, a GPS positioning unit 132, and a distance sensor 133. In some embodiments, the magnetic field sensor 131 includes a compass, and the distance sensor 133 includes a barometer. The positioning assembly 13 is electrically coupled to the main controller 16. The main controller 16 is further configured to detect operational data of the magnetic field sensor 131 and the GPS positioning unit 132. In other embodiments, the distance sensor 133 may include an ultrasonic sensor or the like, which is not limited to the above examples.

The memory 14 can be an SD card, an MMC card, or a FLASH memory. In some embodiments, the memory 14 includes a 4G SD card, which is relatively cheap and can thus reduce the cost of the product.

The signal receiver 15 is configured to receive a remote control signal transmitted by the mobile terminal 20 and a GPS positioning signal indicating where the unmanned aerial vehicle 10 flies to (also referred to as a destination indication GPS signal, and to send the received remote control signal and the GPS positioning signal to the main controller 16. In some embodiments, the mobile terminal 20 is a remote controller, an iPad, an iPhone, or the like. In other embodiments, the mobile terminal 20 may be a ground station.

In some embodiments, the main controller 16 may be implemented with an 8-bit or 32-bit MCU, and may have an SPI interface and/or an SDIO interface, and PWM output and/or DAC output capabilities. As the cost of the existing 8-bit or 32-bit MCU is relatively low, using an 8-bit or 32-bit MCU for the main controller 16 can further reduce the cost of the product. The main controller 16 can be electrically coupled to the signal receiver 15 through an SPI protocol or an SDIO protocol. In some embodiments, the main controller 16 and the signal receiver 15 can be electrically coupled to each other through a communication manner such as a 4-line SPI, 6-line SIDO-4 bit, or 4-line SIDO-4 bit. The signal receiver 15 is electrically coupled to the positioning assembly 13 and the power assembly 17. The main controller 16 is configured to extract operational data of the gyroscope 121, the angular velocity meter 122, the magnetic field sensor 131, and the GPS positioning unit 132. The main controller 16 is further configured to control the power assembly 17.

The main controller 16 may also be configured according to actual needs, which is not limited to the above examples.

The main controller 16 is further configured to receive a flight aiding instruction sent by the mobile terminal 20, record a position of a point of interest and a current location of the unmanned aerial vehicle 10, and define a forward flight direction of the unmanned aerial vehicle based on the position of the point of interest and the current location of the unmanned aerial vehicle 10.

The mobile terminal 20 sends a flight aiding instruction to the unmanned aerial vehicle 10. In some embodiments, the mobile terminal 20 and the unmanned aerial vehicle 10 are in wireless communication, and the signal receiver 15 of the unmanned aerial vehicle 10 receives the flight aiding instruction and sends the received flight aiding instruction to the main controller 16 of the unmanned aerial vehicle 10.

The point of interest may be a takeoff point of the unmanned aerial vehicle 10, or the location of the mobile terminal 20. In some embodiments, the takeoff point is a position recorded when enough positioning satellites are found by searching for the first time after the unmanned aerial vehicle is powered on. When the mobile terminal 20 is installed with a GPS, the position of the mobile terminal 20 can be recorded by the GPS on the mobile terminal 20. That is, the point of interest changes with a change in the position of the mobile terminal 20.

The forward flight direction refers to a direction when a pitch stick of the mobile terminal 20, which is used for controlling the unmanned aerial vehicle 10 to fly, controls the unmanned aerial vehicle 10 to fly forward relative to the position of the point of interest. As shown in FIG. 4, the forward flight direction is a direction along an extension line of a connection-line between the point of interest and the location point of the unmanned aerial vehicle 10, i.e., an extension line of a connection-line between a coordinate of the point of interest in a two-dimensional plane and a coordinate of the location point of the unmanned aerial vehicle 10 in the two-dimensional plane. For example, the coordinate of the point of interest is (X0, Y0, Z0), the coordinate of the location point of the unmanned aerial vehicle 10 is (X1, Y1, Z1), and the forward flight direction is an extension line of a connection-line between the point of interest (X0, Y0) and the location point (X1, Y1) of the unmanned aerial vehicle 10.

The main controller 16 is further configured to, based on the forward flight direction of the unmanned aerial vehicle, lock the heading of the unmanned aerial vehicle 10, and control the unmanned aerial vehicle to perform a return flight by taking a connection line in the two-dimensional plane between the position of the unmanned aerial vehicle 10 at the time when the return flight is executed and the position of the point of interest as a motion trajectory.

As shown in FIGS. 3 and 4, when the unmanned aerial vehicle 10 receives an instruction to execute pitch control, the unmanned aerial vehicle 10 accelerates along a radial direction (along a radius direction) and, at the same time, the position and velocity of the unmanned aerial vehicle 10 in in a tangent direction (a tangent direction the unmanned aerial vehicle 10 is in, i.e., a direction tangential to a circumference of a circle that takes the point of interest as the center of the circle and a distance between the location of the unmanned aerial vehicle 10 and the point of interest as a radius) are controlled, e.g., the position of the unmanned aerial vehicle 10 in the tangent direction is controlled to remain unchanged and the velocity of the unmanned aerial vehicle 10 in the tangent direction is controlled to remain zero. The acceleration $(a_x, a_y)$ of the unmanned aerial vehicle 10 in the ground coordinate system defined relative to the ground is used as a control quantity, and then the control quantity is converted to a control quantity in the body coordinate system defined relative to the unmanned aerial vehicle:

$$\begin{bmatrix} \alpha_x^b \\ \alpha_y^b \end{bmatrix} = R \begin{bmatrix} \alpha_x \\ \alpha_y \end{bmatrix}$$

The unmanned aerial vehicle 10 can achieve radial accelerated motion according to the control command.

In a process of executing the return flight, when a distance between the unmanned aerial vehicle 10 and the point of interest is shorter than a first threshold, the main controller 16 can control the unmanned aerial vehicle 10 to decelerate until the unmanned aerial vehicle 10 hovers. In some embodiments, the first threshold can be between about 50 meters and about 100 meters. In other embodiments, the first threshold may be set as needed, and is not limited to the above examples.

While remotely controlling an unmanned aerial vehicle, the operator sometimes needs the unmanned aerial vehicle to fly around a point of interest, such as a transmission line fault point, a disaster frequent point, an accident occurring point, or the like, to perform a fly-around monitoring. The main controller 16 is further configured to execute a point of interest circling mode based on the defined forward flight direction of the unmanned aerial vehicle. When the signal receiver 15 receives an instruction to execute pitch control, the main controller 16 controls the unmanned aerial vehicle 10 to accelerate along a radial direction and, at the same time, controls the position and velocity of the unmanned aerial vehicle 10 in a tangent direction.

When the signal receiver 15 receives an instruction to execute roll control, the main controller 16 controls the unmanned aerial vehicle 10 to lock its flight to perform a circular motion on a circle with a radius and, at the same time, controls the velocity of the unmanned aerial 10 in the radial direction to approximately zero. This is equivalent to giving a tangent acceleration to the unmanned aerial vehicle 10, as shown in FIG. 4. In some embodiments, command quantity refers to a desired control position of the unmanned aerial vehicle 10, $(x_r, y_r)$, which can be represented in a form of polar coordinates as follows:

$$\begin{cases} x_r = r\cos\theta \\ y_r = r\sin\theta \end{cases},$$

where r is a distance from the unmanned aerial vehicle to a home point, i.e., a point of interest, which remains unchanged in a circling process, and θ is an angular coordinate, which can be, e.g., a polar angle or an azimuthal angle.

Feedback quantity: the current position of the unmanned aerial vehicle (x, y).

Deviation quantity: a difference between the desired control position and the current position of the unmanned aerial vehicle:

$$\begin{cases} e_x = x_r - x \\ e_y = y_r - y \end{cases}$$

where $e_x$ indicates a position deviation in the direction of the x axis, and $e_y$ indicates a position deviation in the direction of the y axis.

The control quantity can be obtained through a calculation by the trajectory return module 34 of the unmanned aerial vehicle 10 based on the deviation quantity. The calculation process is as follows:

First, the control quantity in the ground coordinate system is calculated:

$$\begin{cases} u_x = f(e_x) \\ u_y = g(e_y) \end{cases},$$

which is then converted to the control quantity in the body coordinate system:

$$\begin{bmatrix} u_x^b \\ u_y^b \end{bmatrix} = R \begin{bmatrix} u_x \\ u_y \end{bmatrix},$$

where $$R = \begin{bmatrix} \cos\varphi & -\sin\varphi \\ \sin\varphi & \cos\varphi \end{bmatrix},$$

where and φ is a rotational angle of the body coordinate system (xb, yb) relative to the ground coordinate system (x, y), which is also a yaw angle of the unmanned aerial vehicle 10.

If the unmanned aerial vehicle 10 is performing the circular motion at a velocity of v, a centripetal force $$F_{cen} = m\frac{v^2}{r}$$

may need to be provided. At the same time, the position and velocity of the unmanned aerial vehicle 10 in the radial direction are controlled, and the unmanned aerial vehicle 10 is locked to fly on a circle with a radius of r. From the equation for calculating $F_{cen}$, it can be seen that $F_{cen}$ is directly proportional to v and is inversely proportional to r. Suppose that a maximum centripetal force that the unmanned aerial vehicle 10 can provide is $F_{max}$, which is determined by the maximum yaw angle allowed by the unmanned aerial vehicle 10, then when the unmanned aerial vehicle 10 flies in a circle along a circumference with a radius of r, the maximum allowed velocity is $$v_{max} = \sqrt{\frac{F_{max}r}{m}},$$

which is related to the mass of the unmanned aerial vehicle 10. If it is intended to increase the circling velocity of the unmanned aerial vehicle 10, a flying radius may need to be increased.

When the signal receiver 15 receives a pitch control instruction and a roll control instruction at the same time, the main controller 16 controls the unmanned aerial vehicle 10 to perform a centripetal or a centrifugal motion.

Moreover, when the flight aiding system 30 receives roll and yaw control instructions at the same time, the unmanned aerial vehicle 10 can rotate and lock into a flight of a circular motion on a circle with a certain radius, and the velocity of the unmanned aericle vehicle 10 in the radial direction is controlled to remain approximately zero.

The main controller 16 is further configured to control the gimbal 201 to rotate and to control the imaging device 202 to take pictures while controlling the unmanned aerial vehicle 10 to execute a point of interest circling mode.

Using a flight aiding system consistent with embodiments of the disclosure, an operator without excellent operating skills can control an unmanned aerial vehicle to execute a circular motion around a point of interest, which increases the operator's experience.

For example, by using the flight aiding system 30 for an unmanned aerial vehicle as described above, an operator can control a flight path of the unmanned aerial vehicle without taking his/her eyes off a display screen of the mobile terminal, which avoids blind flying and flyaway, and also improves flight experience of the operator.

In some embodiments, the power assembly 17 includes a plurality of drive motors. In this embodiment, each of the drive motors can be electrically coupled to a corresponding electronic speed control (ESC). Each electronic speed control is electrically connected to the main controller 16. The ESC is configured to receive a control signal of the main controller 16, and control a rotational speed of the corresponding drive motor.

Figure 7:
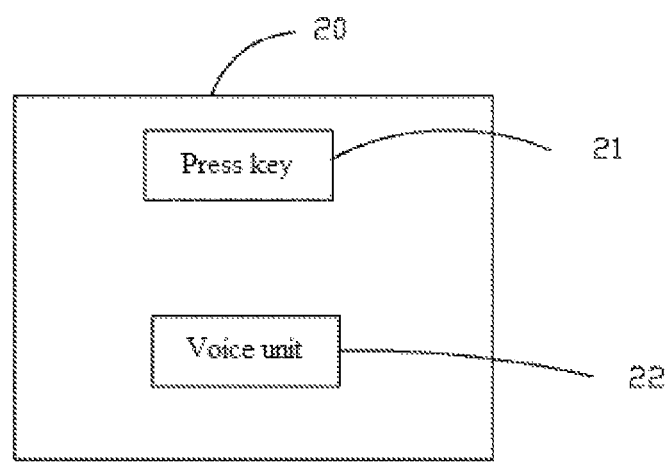
FIG. 7 is a schematic diagram of a frame of a mobile terminal according to an embodiment of the present disclosure.

Referring to FIG. 2 and FIG. 7 together, the mobile terminal 20 for controlling the unmanned aerial vehicle 10 according to an embodiment of the present disclosure is configured to send a flight aiding instruction to cause the unmanned aerial vehicle 10 to define a forward flight direction of the unmanned aerial vehicle 10 based on the position of the mobile terminal 20 or the position of the point of interest selected by the mobile terminal 20 and a current location of the unmanned aerial vehicle 10.

In some embodiments, the mobile terminal 20 and the unmanned aerial vehicle 10 achieve wireless communication through a Wi-Fi network, or a 2G, 3G, 4G, or 5G network. In some embodiments, as shown in FIG. 7, the mobile terminal 20 is a remote controller including a button 21 that starts the flight aiding function. In other embodiments, the mobile terminal 20 may be a tablet computer or a mobile phone having a virtual button for starting the flight aiding function. The mobile terminal 20 displays a satellite map, and the point of interest may also be a point selected from a satellite map displayed by the tablet computer or the mobile phone.

The mobile terminal 20 further includes a voice unit 22 for broadcasting an orientation of the unmanned aerial vehicle 10 relative to the point of interest. For example, a voice prompts position information and flight attitude information of the unmanned aerial vehicle 10, including that the unmanned aerial vehicle 10 is at what degrees in which direction of the operator or the mobile terminal 20, how many meters the unmanned aerial vehicle is away from the operator or the mobile terminal 20, what the altitude of the unmanned aerial vehicle is at, or the like. For example, a voice can broadcast "the unmanned aerial vehicle is at 30 degrees in your northeast, and you can see the unmanned aerial vehicle by raising your head 50 degrees," and thus the operator's flight experience is improved.

According to the flight aiding method and system, the unmanned aerial vehicle and the mobile terminal of the present disclosure, an operator only needs to trigger the unmanned aerial vehicle to execute a flight aiding function, the operator can control a flight path of the unmanned aerial vehicle freely even without taking his/her eyes off a display screen of the mobile terminal. Thus, blind flying and flyaway can be avoided and, at the same time, flight experience of the operator is improved.

The above descriptions are merely related to embodiments of the present disclosure, but are not intended to limit the scope of the present disclosure. Any equivalent structure or equivalent process variation made by using contents of the specification and the drawings of the present disclosure, or directly or indirectly applied to other related technical fields, should be likewise included in the scope of the present disclosure.

What is claimed is:

1. A flight aiding method for an unmanned aerial vehicle comprising:
   receiving, from a mobile terminal that controls the unmanned aerial vehicle, a flight aiding instruction to execute a flight aiding function; and
   in response to receiving the flight aiding instruction, controlling, regardless of a head direction that a head of the unmanned aerial vehicle is pointing, the unmanned aerial vehicle to fly by controlling a velocity of the unmanned aerial vehicle along a reference direction, the reference direction being defined for the unmanned aerial vehicle based on a position of a point of interest and a current location of the unmanned aerial vehicle;
   wherein controlling the unmanned aerial vehicle to fly includes in response to receiving an instruction to execute a return flight mode:
      regardless the head direction of the unmanned aerial vehicle:
         locking a heading of the unmanned aerial vehicle; and
         controlling the unmanned aerial vehicle to fly along a motion trajectory that is defined based on the current position of the unmanned aerial vehicle and the position of the point of interest.

2. The flight adding method according to claim 1, wherein controlling the unmanned aerial vehicle to fly further includes:
   controlling, in response to receiving a forward flight instruction, the unmanned aerial vehicle to fly along the reference direction regardless of the head direction.

3. The flight adding method according to claim 2, wherein controlling the unmanned aerial vehicle to fly further includes:
   receiving the forward flight instruction sent from the mobile terminal in response to a pitch stick of the mobile terminal controlling the unmanned aerial vehicle to fly forward.

4. The flight adding method according to claim 1, wherein controlling the unmanned aerial vehicle to fly further includes:
   controlling, in response to receiving the flight aiding instruction, the unmanned aerial vehicle to enter a headless mode.

5. The flight aiding method according to claim 1, wherein the reference direction is defined to be a direction from a projection of the position of the point of interest on a horizontal plane to a projection of the current location of the unmanned aerial vehicle on the horizontal plane.

6. The flight aiding method according to claim 1, wherein the motion trajectory is a connection line between the current position of the unmanned aerial vehicle and the position of the point of interest.

7. The flight aiding method according to claim 1, wherein controlling the unmanned aerial vehicle to fly further includes:
   receiving, prior to entering the return flight mode, the instruction to execute the return flight mode sent from the mobile terminal in response to a pitch stick of the mobile terminal being operated downwards.

8. The flight aiding method according to claim 1, wherein controlling the unmanned aerial vehicle to fly further includes:
   executing a point of interest mode based on the reference direction.

9. The flight aiding method according to claim 8, wherein executing the point of interest mode includes:

receiving a pitch control instruction; and in response to receiving the pitch control instruction:
controlling the unmanned aerial vehicle to accelerate along the reference direction; and
controlling a velocity of the unmanned aerial vehicle perpendicular to the reference direction to remain zero.

10. The flight aiding method according to claim 8, wherein executing the point of interest mode includes:
receiving a roll control instruction; and
in response to receiving the roll control instruction, controlling the unmanned aerial vehicle to fly perpendicular to the reference direction at a fixed radius to perform a circular motion around the point of interest.

11. The flight aiding method according to claim 8, wherein executing the point of interest mode includes:
receiving a yaw-and-roll control instruction; and
in response to receiving the yaw-and-roll control instruction, controlling the unmanned aerial vehicle to simultaneously:
rotate around a central axis of the unmanned aerial vehicle; and
fly perpendicular to the reference direction at a fixed radius to perform a circular motion around the point of interest.

12. The flight aiding method according to claim 8, wherein executing the point of interest mode includes:
receiving a pitch-and-roll control instruction; and
in response to receiving the pitch-and-roll control instruction, controlling the unmanned aerial vehicle to perform a centripetal or centrifugal motion using the reference direction as a radial direction.

13. The flight aiding method according to claim 1, wherein controlling the unmanned aerial vehicle to fly further includes:
in response to a distance between the unmanned aerial vehicle and the point of interest being shorter than a first threshold, controlling the unmanned aerial vehicle to decelerate until the unmanned aerial vehicle hovers.

14. The flight adding method according to claim 1, wherein the point of interest includes one of:
a takeoff point of the unmanned aerial vehicle;
a location of the mobile terminal; and
a point selected through the mobile terminal.

15. An unmanned aerial vehicle comprising:
a casing; and
a main controller disposed in the casing, the main controller being configured to:
receive, from a mobile terminal that controls the unmanned aerial vehicle, a flight aiding instruction to execute a flight aiding function; and
in response to receiving the flight aiding instruction, control, regardless of a head direction that a head of the unmanned aerial vehicle is pointing, the unmanned aerial vehicle to fly by controlling a velocity of the unmanned aerial vehicle along a reference direction, the reference direction being defined for the unmanned aerial vehicle based on a position of a point of interest and a current location of the unmanned aerial vehicle;
wherein controlling the unmanned aerial vehicle to fly includes in response to receiving an instruction to execute a return flight mode:
regardless the head direction of the unmanned aerial vehicle:
locking a heading of the unmanned aerial vehicle; and
controlling the unmanned aerial vehicle to fly along a motion trajectory that is defined based on the current position of the unmanned aerial vehicle and the position of the point of interest.

16. The unmanned aerial vehicle according to claim 15, wherein the main controller is further configured to:
control, in response to receiving a forward flight instruction, the unmanned aerial vehicle to fly along the reference direction regardless of the head direction.

17. The unmanned aerial vehicle according to claim 16, wherein the main controller is further configured to:
receive the forward flight instruction sent from the mobile terminal in response to a pitch stick of the mobile terminal controlling the unmanned aerial vehicle to fly forward.

18. The unmanned aerial vehicle according to claim 15, wherein the main controller is further configured to:
control, in response to receiving the flight aiding instruction, the unmanned aerial vehicle to enter a headless mode.

19. The unmanned aerial vehicle according to claim 15, wherein:
the reference direction is defined to be a direction from a projection of the position of the point of interest on a horizontal plane to a projection of the current location of the unmanned aerial vehicle on the horizontal plane.

* * * * *